United States Patent [19]
Lin et al.

[11] Patent Number: 5,960,112
[45] Date of Patent: Sep. 28, 1999

[54] METHOD AND DEVICE FOR THE AUTOMATIC MATCHING OF SEAL PRINTS

[75] Inventors: Wen-Han Lin; Chung-Ming Huang, both of Hsinchu, Taiwan

[73] Assignee: Wen-Hsing HSU, Hsinchu, Taiwan

[21] Appl. No.: 08/756,524

[22] Filed: Nov. 26, 1996

[51] Int. Cl.$^6$ .............................. G06K 9/68; G06K 9/00
[52] U.S. Cl. .................. 382/218; 382/100; 382/190; 382/209
[58] Field of Search .................... 382/228, 266, 382/227, 298, 296, 100, 112–113, 115, 135, 185, 190, 209, 218–220, 224, 229, 192, 201, 205

[56] References Cited

U.S. PATENT DOCUMENTS

| | | | |
|---|---|---|---|
| 3,968,475 | 7/1976 | McMahon | 390/146.3 |
| 4,155,072 | 5/1979 | Kawa | 340/146.3 |
| 4,288,779 | 9/1981 | Otsu et al. | 340/146.3 |
| 4,461,028 | 7/1984 | Okubo | 382/155 |
| 4,464,786 | 8/1984 | Nishito et al. | 382/135 |
| 5,265,174 | 11/1993 | Nakatsuka | 382/227 |
| 5,392,367 | 2/1995 | Hsu et al. | 382/228 |
| 5,621,810 | 4/1997 | Suzuki et al. | 382/135 |
| 5,636,291 | 6/1997 | Bellegarda et al. | 382/187 |

*Primary Examiner*—Leo H. Boudreau
*Assistant Examiner*—Bhavesh Mehta
*Attorney, Agent, or Firm*—Bacon & Thomas, PLLC

[57] ABSTRACT

A method and a device for the automatic matching of seal prints including a first memory to store reference seal prints, an input device to obtain the image of a test seal print, a second memory to store the test seal print, an image structure similarity calculation device to calculate the similarity in the structure of the image of the reference seal print and the test seal print, a line distribution similarity calculation device to calculate the similarity in the distribution of the lines in the reference seal print and the test seal print, an incompleteness calculation device to calculate the incompleteness of the image of the reference seal print and the test seal print, and a determination device to determine whether the two seal prints are from the same source according to a pre-determined threshold.

23 Claims, 5 Drawing Sheets

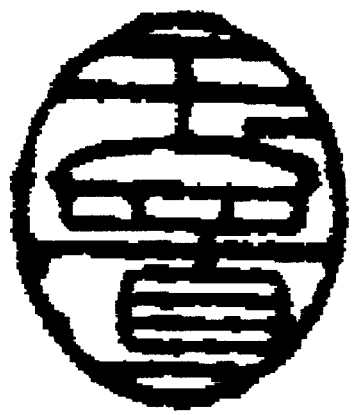
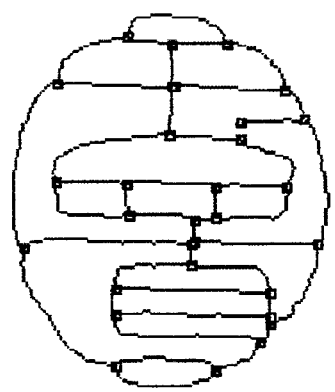
Fig. 3      Fig. 4
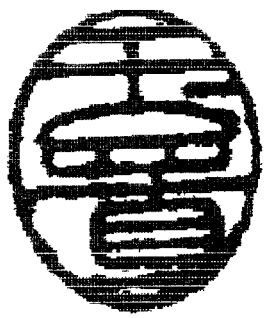
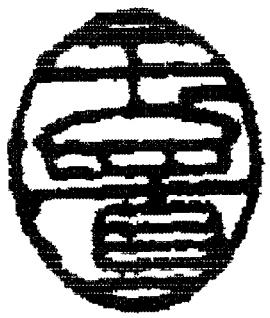
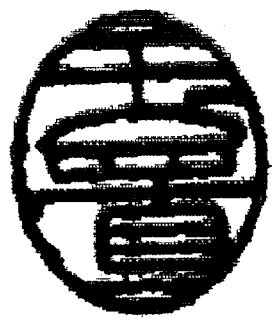
Fig. 5      Fig. 6
Fig. 7

Fig. 8

|   | a | b | c | d | e | f | g | h |
|---|---|---|---|---|---|---|---|---|
| 1 |   |   |   | FF |    | FF |    |    |
| 2 |   |   | FF | 0 | FF | 0 | FF |    |
| 3 |   | FF | 0 | 0 | 0 | 0 | FF |    |
| 4 |   | FF | 0 | 0 | 0 | 0 | FF |    |
| 5 |   | FF | 0 | 0 | 0 | 0 | 0 | FF |
| 6 |   |   | FF | 0 | 0 | 0 | FF |    |
| 7 |   |   |   | FF | FF | FF |    |    |
| 8 |   |   |   |   |   |   |   |    |

Fig. 9

|   | a | b | c | d | e | f | g | h |
|---|---|---|---|---|---|---|---|---|
| 1 |   |   |   | FF |   | FF |   |   |
| 2 |   |   | FF | 1 | FF | 2 | FF |   |
| 3 |   | FF | 3 | 1 | 1 | 2 | FF |   |
| 4 |   | FF | 3 | 1 | 1 | 2 | FF |   |
| 5 |   | FF | 3 | 1 | 1 | 2 | 2 | FF |
| 6 |   |   | FF | 1 | 1 | 2 | FF | 4 |
| 7 |   |   |   | FF | FF | FF | 5 | 4 |
| 8 |   |   |   |   |   |   | 5 | 4 |

Fig. 10

|   | a | b | c | d | e | f | g | h |
|---|---|---|---|---|---|---|---|---|
| 1 |   |   |   | FF |   | FF |   |   |
| 2 |   |   | FF | 1 | FF | 1 | FF |   |
| 3 |   | FF | 1 | 1 | 1 | 1 | FF |   |
| 4 |   | FF | 1 | 1 | 1 | 1 | FF |   |
| 5 |   | FF | 1 | 1 | 1 | 1 | 1 | FF |
| 6 |   |   | FF | 1 | 1 | 1 | FF | 0 |
| 7 |   |   |   | FF | FF | FF | 0 | 0 |
| 8 |   |   |   |   |   |   | 0 | 0 |

METHOD AND DEVICE FOR THE AUTOMATIC MATCHING OF SEAL PRINTS

FIELD OF INVENTION

The present invention relates to a method and a device for the automatic matching of seal prints, especially to a method and a device which can identify whether two digitized seal prints are obtained from the same source.

BACKGROUND OF INVENTION

The matching of seal prints is a very important method to identify whether a documents genuine, in the oriental society, especially in the Chinese society. In the Chinese society, a document made by an author shall contain a seal print. While the seal print is identified a genuine print of the original seal owned by the author, the document is deemed genuine; i.e., the document is deemed made by the author.

Although the application of computer systems becomes common in the oriental society, using a computer to automatically identify whether a seal print is genuine, is still under development. Among the technologies already available, several semi-automatic seal print matching systems are widely used by the bank to identify the seal prints printed on the withdrawal slips. To describe such a semi-automatic matching system, the function of the seal prints in the bank practice will be introduced.

While a customer opens a savings account in a bank, the customer shall register his (her) seal print with the bank. The seal print is printed on a "seal print card" and is kept by the bank. When the customer withdraw his money from the bank, he fills a withdrawal slip and chop the original seal on the slip so that the seal print of the seal appears on the slip. The slip is then given to a teller of the bank. The teller matches the seal print on the slip with the seal print as recorded on the seal print card. If the seal prints are identical, the teller allows the withdrawal; Otherwise, the withdrawal is rejected.

While the semi-automatic system is used to help the teller in the identification of the seal print, the seal print of the original seal is recorded in the computer of the semi-automatic matching system. In doing this, the print of the original seal is printed on the seal print card and is then scanned by a scanner. The scanner scans the seal print, converts the image into a digitized format and saves the image data in a computer. When the customer wishes to withdraw his money from the bank, he fills a withdrawal slip and prints a seal print on the slip. The teller then recalls the image of the original seal print from the computer and uses the scanner to scan the seal print on the withdrawal slip. The system displays both the image of the original seal print and the image of the seal print on the withdrawal slip on the screen of the system, with different colors. The teller adjusts the position of the image of the seal print on the withdrawal slip with the help of a mouse, or merely by means of moving the withdrawal slip in relating to the scanner (in such a case, the scanner is a CCD camera). The identification of the two seal prints is conducted by the teller with human eyes. In other words, while the two images are overlapped with each other, the teller determines whether they are identical according to the image as displayed on the screen. If the pixels of the two images are overlapped to some extend, the two seal prints are considered identical; Otherwise, they are considered not identical.

Taiwan utility model registration No. 78873 relates to an "Image identification Platform" and discloses one of the semi-automatic seal print matching systems as described above. Although the semi-automatic systems can help the tellers to display the registered seal print in a very short time without the need to look up the seal print card, however, it is necessary for the teller to identify the seal print with human eyes. There is no objective criteria for the tellers to determine whether a seal print is genuine; All are decided based on experiences of the tellers. Especially when the seal print is printed by a counterfeit seal which is made by computerized imitation technology, a great amount of lose will happen to the bank.

It is then necessary for the industry to have an automatic seal print matching system that can match seal prints under objective criteria automatically.

OBJECTS OF THE INVENTION

The object of this invention is to provide an automatic seal print matching device that can match seal prints automatically.

Another object of this invention is to provide an automatic seal print matching device that can match seal prints with objective criteria.

Another object of this invention is to provide an automatic seal print matching device that can enhance the speed of the matching of seal prints.

Another object of this invention is to provide an automatic seal print matching method that has the above-said advantages.

SUMMARY OF THE INVENTION

According to the present invention, a method and a device for the automatic matching of seal prints is provided. The device of this invention comprises: a first memory to store reference seal prints, an input device to obtain the image of a test seal print, a second memory to store the test seal print, an image structure similarity calculation device to calculate the similarity in the structure of the image of the reference seal print and the test seal print, a line distribution similarity calculation device to calculate the similarity in the distribution of the lines in the reference seal print and the test seal print, a incompleteness calculation device to calculate the incompleteness of the image of the reference seal print and the test seal print, and a determination device to determine whether the two seal prints are from the same source according to a pre-determined threshold.

The above and other objects and advantages of this invention can be fully understood from the detailed description by referring to the following drawings. In the drawings, FIG. 1 illustrates the system schematics of the automatic seal print matching device of this invention.

FIG. 3 illustrates a digitized image of a seal print.

FIG. 4 illustrates the image data of FIG. 3 after the process of thinning and feature abstraction.

FIG. 5 shows two seal print to be matched according to the method of the invention.

FIG. 6 shows the result of overlapping of the images of FIG. 5.

FIG. 7 shows a 2*2 mask used in this invention to label the surrounded area of the seal prints.

FIG. 8 shows an image containing a surrounded area to be labeled.

FIG. 9 shows the image of FIG. 8 as labeled.

FIG. 10 shows the image of FIG. 9 after some surplus pixels are deleted.

DETAILED DESCRIPTION OF THE INVENTION

Figure 1:
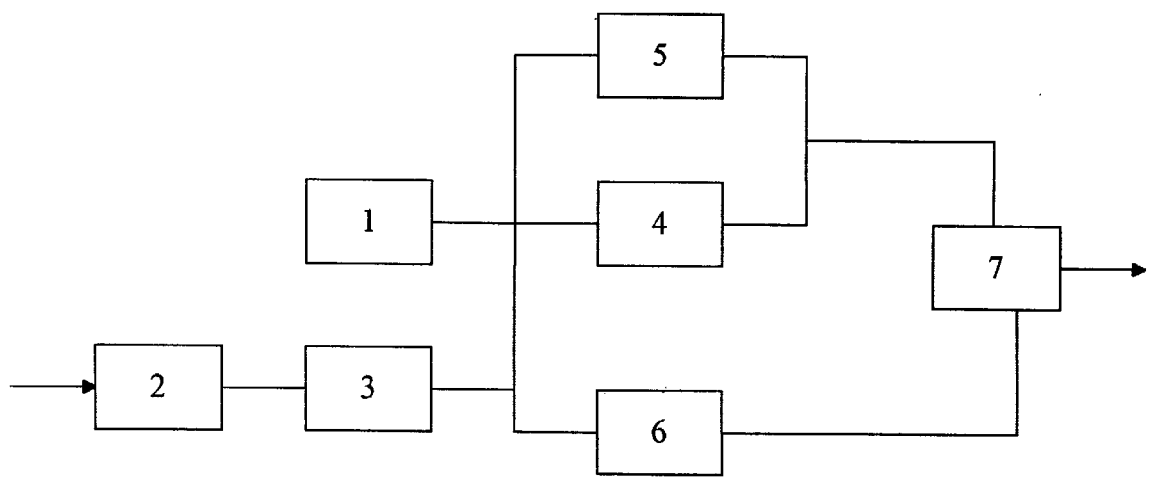

In the automatic matching of seal prints of the present invention, the matching of seal prints is processed according to the following factors:

1. Similarity in the structure of the image of the seal prints.
2. Similarity in the distribution of the lines in the seal prints.
3. Incompleteness of the image of the seal prints.

According to the embodiment of the present invention, the similarity in the image structure of the seal prints are calculated according to the following processes:

1. Digitization of the seal prints to be matched.
2. Thinning of the digitized image of the seal prints.
3. Abstracting the feature points of the seal print images. Here, the "feature points" include the terminal points and cross points of the lines obtained from the thinning process.
4. Mating of the coordinates of the feature points of the seal prints.
5. Calculating the similarity of the image structure of the seal prints. The calculation of the similarity in the line distribution of the seal prints includes:
   1. Digitization of the images of the two seal prints.
   2. Locating the reference points of the two images.
   3. Adjusting the image of the reference seal print with a rotation parameter.
   4. Overlapping the two images at the reference points.
   5. Calculating the similarity in the line distribution of the seal prints.

An index of similarity of the two seal prints (Index) is calculated according to the following equation:

Index=($W_1$*Similarity in image structure+$W_2$*Similarity in line distribution)/W wherein W, $W_1$ and $W_2$ are constants and W=$W_1$+$W_2$. In some embodiments $W_1$ is 5 and $W_2$ is 1.

The calculation of the incompleteness of the images of the seal prints includes:

1. Digitization of the images of the two seal prints.
2. Labeling the surrounded areas of the images.
3. Recording the number of the surrounded areas and the scope of the areas in sequence from large to small.
4. Calculating the difference in area of the surrounded areas of the two seal prints.
5. Taking the difference as the index of incompleteness of the seal prints.

In determining the two seal prints are from a same source, the "index of similarity" is taken as the major factor. Thus, if the index of similarity is equal to or greater than a predetermined threshold, the two seal prints are considered from the same source; Otherwise, they are considered from different source.

While the index of incompleteness of the seal prints is greater than a threshold of incompleteness, the device generates a warning signal to the operator. The incompleteness of seal prints happens in the following two cases:

1. Defected seal prints: In printing the seal prints, the print could be polluted by the ink or defected because of mal-printing. In obtaining the "original" seal print, such as printing on the seal print card, it is required that the prints be perfect. Under this procedure, only those prints with index of incompleteness equal to or less than a threshold of incompleteness are accepted as "original" prints.

2. Counterfeit seals: The index of incompleteness discloses very fine differences between seal prints. Although the computerized imitation technology makes it possible to imitate the image of a seal print, the imitation will have very small difference with the original. The index of incompleteness can help the teller to find out possible imitating seal prints.

The following is a detailed description of an embodiment of the device and the method for the automatic matching of seal prints of this invention.

Figure 2:
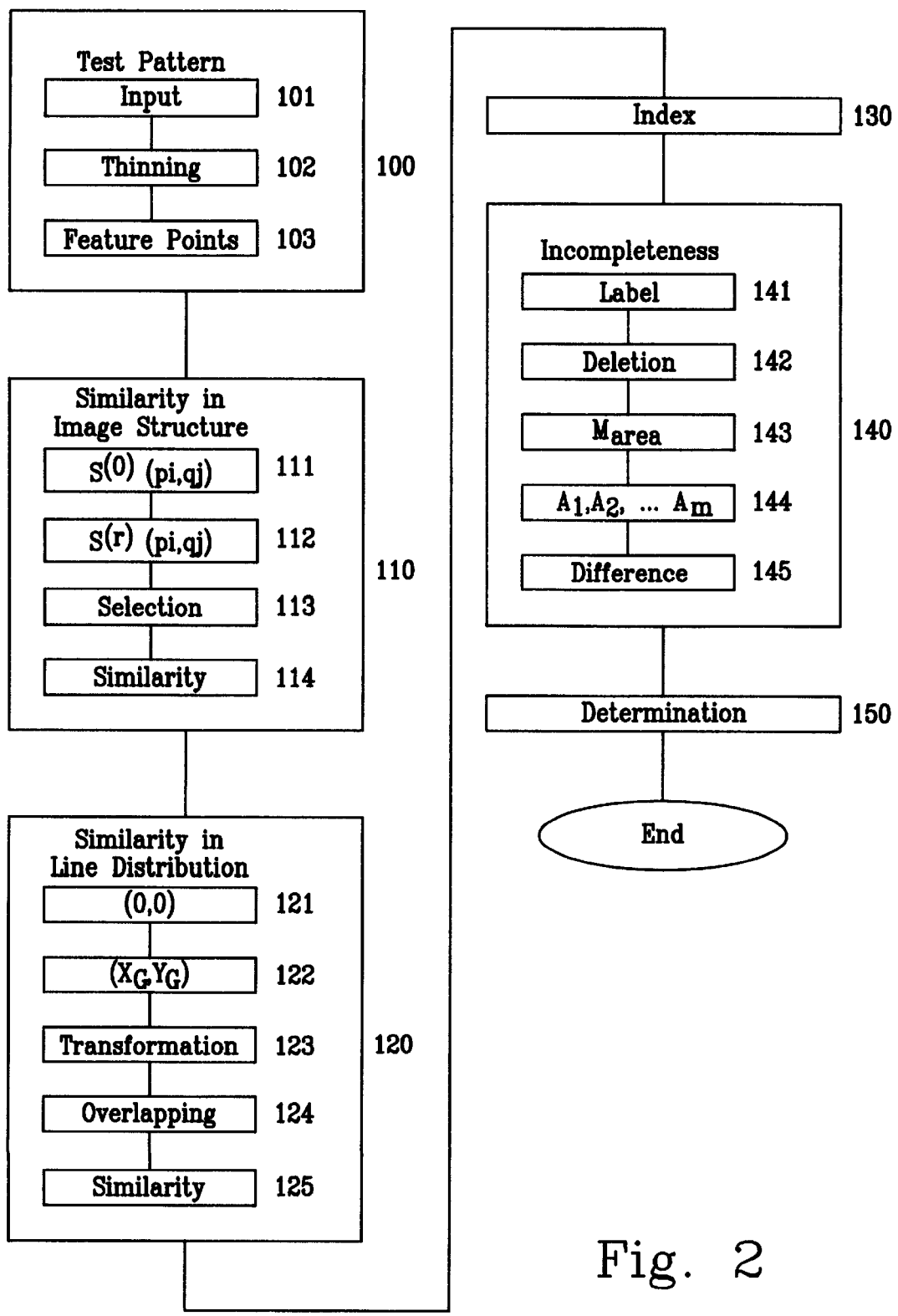
FIG. 2 illustrates the flow chart of the method for automatic matching for seal prints of this invention.

FIG. 1 illustrates the system schematics of the automatic seal print matching device of this invention. FIG. 2 illustrates the flow chart of the method for automatic matching for seal prints of this invention.

As shown in FIG. 1, the device for the automatic matching of seal prints of this invention comprises: a first memory (1) to store reference seal prints, an input device (2) to obtain the image of a test seal print, a second memory (3) to store the test seal print, an image structure similarity calculation device (4) to calculate the similarity in the structure of the image of the reference seal print and the test seal print, a line distribution similarity calculation device (5) to calculate the similarity in the distribution of the lines in the reference seal print and the test seal print, an incompleteness calculation device (6) to calculate the incompleteness of the image of the reference seal print and the test seal print, and a determination device (7) to determine whether the two seal prints are from the same source according to a predetermined threshold.

The matching of seal prints of the present invention will be described according to FIG. 2 in the followings.

Thinning and Feature Abstraction

At 101 a test pattern representing the seal print to be matched is obtained. First, at 101, the input device 2 inputs the digitized image of a test seal print and stores it in the second memory 3. The input device 2 can be an image scanner or a CCD (charge coupler device) camera. In application, the test seal print is printed on a piece of paper and the input device 2 takes the picture (image) of the seal print and converts it into a digitized format. FIG. 3 illustrates a digitized image of a seal print. If the image is a black-and-white image, "00" can be used to represent the "background" pixels and "FF" can be used to represent the "image" pixels.

The digitized image of a reference seal print is stored in the first memory 1. The image is similar to that shown in FIG. 3. Here, the reference seal print is the "original" seal print and the test seal print is the seal print to be determined whether it is a genuine print of the origin seal of the reference seal print. We use pattern P to represent the image data of the test seal print and pattern Q to represent the image data of the reference seal print.

At 102 the image structure similarity calculation device 4 conducts the "thinning" of both pattern P and pattern Q. Here, thinning means the processing of a digitized image to abstract the lines contained in the image such that the lines can be one-pixel wide. Taiwan patent application No. 78102864 relates to a "Method and Device for the thinning and feature abstraction of binary images" and disclosed an effective approach for the thinning of digitized images.

As an image is processed with thinning, it contains several line sections or curve sections. Statistics shows that the lines or curves will have terminal points and cross points. The terminal points and cross points are then taken as feature points at 103. The feature points abstraction technology disclosed in the above-said Taiwan patent can be a suited approach for this purpose and is taken for reference. FIG. 4 illustrates the image data of FIG. 3 after the process of thinning and feature abstraction.

Similarity in Image Structure

At 110 the similarity in image structure of the seal prints are calculated. The similarity is calculated by matching of the feature points of the patterns representing the seal prints. The matching of the feature points can be processed according to any pattern matching technology. Taiwan patent application No. 79109743 relates to a "Method and Device for the Automatic Matching and Identification of Planar Point Patterns" and discloses an effective approach for the matching of two planar point patterns.

In this conventional art of matching, the two patterns to be matched are:

Pattern P={p1, p2, p3, . . . , pm}, m is the number of points in pattern P;

Pattern Q={q2, q2, q3, . . . , qn}, n is the number of points in pattern Q.

At 111, an initial mated possibility $S^{(0)}(pi, qj)$ is designated to every pair of points consisted of a point from pattern P (point pi, i=1, 2, 3, . . . , m) and a point from pattern Q (qj, j=1, 2, 3, . . . , n). Here, "mated" means when two patterns P and Q are identical or similar, for every point pi there is an only point qj that is overlapped with or is very close to pi when pi and qj are in the same planar coordinate; "mated possibility" means the possibility that pi and qj are mated. In practice, the initial mated possibilities are supposed of one value. A "coarse mating" step is recommended to decide the initial mated possibility in which pairs of points pi and qj that are not qualified mated are given the initial mated possibility of 0 and others are given the initial mated possibility of 1.

At 112, the initial mated possibility is adjusted repeatedly by the mated possibilities of other pairs of points (ph and qk, h=1, 2, 3, . . . , m, h≠i and k=1, 2, 3, . . . , m, k≠j) under the premise that pi and qj are mated. If $S^{(r)}(pi, qj)$ represents the mated possibility of pi and qj at the $r^{th}$ time of adjustment, then we have:

$$S^{(r)}(p_i, q_j) = \frac{\sum_{h \neq i, k \neq j} \{\max[S^{(r-1)}(p_i, q_j) \times C_{ij}(h, k)]\}}{m - 1} \quad (1)$$

wherein Cijhk(h, k) represents the mated possibility of ph and qk if pi and qj are mated and $$C_{ij}(h, k) = \frac{1}{1 + \Delta} \text{ wherein } \Delta = \frac{|l_{ih} - l_{jk}|}{|l_{ih} + l_{jk}|},$$

1 represents the distance between the related points.

As the mated possibilities of all pi and qj points are obtained, a "sequential-forward selection" is used to select the mated pairs from the patterns at 113. According to the sequential-forward selection approach, a matrix [Sij] is used to represent the mated possibilities. In the selection of the mated pairs, the pi and qj points with the highest mated possibility is selected as a mated pair and the elements in column i and row j of [Sij] are deleted. The selection is repeated until [Sij] is an empty cell. Number of mated pairs K is recorded.

After the mated pairs are selected, at 114 the similarity of the patterns (Score) is calculated according to the following equation:

$$\text{Score} = \frac{X_1 \times X_2}{X_3 \times X_4} \times C \quad (2)$$

wherein:

C is a constant;

$$X_1 = \frac{K^2}{m \times n};$$

$$X_2 = \frac{1}{K}\left[\sum_{1}^{K} S^{(r)}(p_i, q_j)\right];$$

$$X_3 = \frac{1}{K}\left[\sum_{i=1}^{K}(x_{pi} - x_{qj})^2 + (y_{pi} - y_{qj})^2\right]; \text{ and}$$

$$X_4 = 1 + |1 - S|,$$

S represents a scaling ratio between pattern P and pattern Q.

The value of Score so obtained is considered the image structure similarity of the two seal prints for the purpose of this invention. Other method of matching of planar point patterns can also be used in the calculation of the similarity in image structure and are taken for reference.

In calculating the similarity in image structure, weights may be used to emphasize any of $X_1$ to $X_4$ so that the value of Score may be increased or decreased.

Similarity in Line Distribution

In the calculation of the similarity in line distribution of the seal prints, the line distribution calculation device 5 determines reference points in both images at 120. The "reference point" will be used as the basis such that the two images may be overlapped for the purpose of matching. The test pattern is preferably adjusted (transformed), using the reference point as the axis according to an equation to be described hereinafter at 123.

The location of the reference point includes the following steps:

At 121, the pixel at the most left-upper corner of a pattern is set as the original point (0,0). At 122 the coordinate of the reference point is calculated. If the pattern is consisted of black-and-white image data, the gray levels of the pixels are "00" (blank) and "FF" (point). Supposing the number of pixels with the gray level of "FF" is N, which coordinates are $(X_1, Y_1), (X_2, Y_2), \ldots, (X_N, Y_N)$, the coordinate of the reference point $(X_G, Y_G)$ may be defined as:

$$(X_G, Y_G) = \left(\frac{\sum_{i=1}^{N} X_i}{N}, \frac{\sum_{j=1}^{N} Y_j}{N}\right) \quad (3)$$

Although it is not intended to limit the scope of this invention, the reasons to select the center of gravity as the reference point of a seal print include: that the center of gravity exists in almost every planar point pattern and that every planar point pattern will have only one center of gravity. The calculation of the center of gravity is a two dimensional calculation and its level of complication is $O(2n^2)$. If we try to locate a reference point such that most points in the patterns are overlapped, the calculation could be a four dimensional one where the level of complication is $O(n^4)$. Nevertheless, the adoption of the center of gravity also enjoy the benefits of the equivalence of moment of force. Since noises could exist in all images, the distribution of noises can be deemed even at any position. By using the center of gravity as the reference point the distortion cause by noises can be reduced due to the symmetric distribution of the noises.

Under such conditions, due to the similarity in the distribution of the feature points, if two seal prints were printed by a same seal, the number of overlapping points must be very great, so long as the reference points are identical. In the other hand, if they were printed by two different seal, no matter how the reference points are decided, there can not be a great number of overlapping points. This is because the seal prints are different in the basic structure.

Of course, other points can serve as reference points. For example, if the seal is a rectangular seal, its corners can be used as reference points. The benefits of using a corner as a reference point include that, in deciding the position of the reference point, only the area around the corner shall be processed. The disadvantages, however, include that the stability of the position of the reference point will be distorted by noises existing at that area. Moreover, a rectangular seal has four corners but not one. At least four times of overlapping shall be processed which means long processing time. Last but not the least, this approach can not apply to round seals.

While the test pattern was printed by the same seal as was the reference pattern, it is possible that the test pattern has been shifted, rotated or scaled, relative to the reference. In such case, the factor $X_3$ in equation (2) is still unreasonably great and Score is not as great as it should be. In order to obtain a correct result, at 123 a geometric transformation is used to adjust the coordinates of the feature points of the test pattern, as follows:

If a cell M represents the mated pairs of points of pattern P and pattern Q wherein $M=m_1, m_2, \ldots, m_k$ and $pi(xi, yi)$ represents mated points in pattern P (i=1, 2, . . . , m) and $qmi(xmi, ymi)$ represents mated points of individual pi point in pattern Q (I=1, 2, . . . , m), then the a geometric transformation R whereby $$\sum_{i=1}^{k}[(xi-xmi')^2+(yi-ymi')^2]$$

has the minimum value is deemed an ideal transformation for pattern Q for the purpose of matching wherein $$\begin{bmatrix} xmi' \\ ymi' \end{bmatrix} = R\begin{bmatrix} xmi \\ ymi \end{bmatrix} = \begin{bmatrix} r1 \\ r2 \end{bmatrix} + \begin{bmatrix} r3 & -r4 \\ r4 & r3 \end{bmatrix}\begin{bmatrix} xmi \\ ymi \end{bmatrix} \quad (4)$$

wherein r1 and r2 represent translation in the vertical and the horizontal direction, r3 and r4 represent rotation.

The test pattern can be transformed according to the above equation (4) such that the value of $X_3$ can be reduced. This transformation can be called "least mean-square-error registration".

At 124 the test pattern, after transformation, is overlapped with the reference pattern using the reference points are the axis. FIG. 5 shows two seal print to be matched and FIG. 6 shows the result of overlapping of the images of FIG. 5.

At 125 the similarity in line distribution of the two patterns is calculated. If the number of points (pixels with the gray level of "FF") in the reference pattern is N, and in the test pattern is $N_2$ and the number of the overlapped points is $N_{12}$, the similarity in line distribution can be calculated according to the following equation:

$$\text{Similarity} = \frac{N_{12} \times (N_1 + N_2)}{N_1 \times N_2} \quad (5)$$

Index of Similarity

From the above-said steps, the similarity in image structure and the similarity in line distribution of the two patterns can be obtained. At 130 an index of similarity is calculated by the determination device 7, according to the following equation:

Index=($W_1$*Similarity in image structure+$W_2$*Similarity in line distribution)/W wherein W, $W_1$ and $W_2$ are constants and $W=W_1+W_2$. In some embodiments $W_1$ is 5 and $W_2$ is 1.

Incompleteness

As described in above, incompleteness may exist while the seal print is a defected print or while the seal is counterfeit. At 140 the incompleteness of the test pattern is calculated by the incompleteness calculation device 6.

In the calculation of the incompleteness, at 141 the surrounded areas of the test pattern is labeled.

In labeling the surrounded areas a 2*2 mask is used to help processing the digitized image of pattern Q. FIG. 7 shows a 2*2 mask used in to label the surrounded area of the test pattern. The mask is positioned at the most left-upper corner of the test pattern and the labeling is conducted from left to right, from up to down. Each time four pixels are processed:

1) If pixel A is FF, it is kept as FF; otherwise,
2) If pixels B and D are FF, A is set a value such as 1; otherwise,
3) If pixel D is FF and pixel B is a value n, A is set as n; otherwise,
4) If pixel B is FF and D is a value m, A is set as m; otherwise,
5) If pixels B and D are n, A is set as n; otherwise,
6) If pixel B is n and pixel D is m, A is set as n or m.

Because the value of a pixel is determined according to the value of its left and upper neighbor pixel, some surplus labels will be remained at the right-down corner of the pattern. At 142 the surplus labels are deleted.

The above-said labeling processing is described in details by referring to the figures. FIG. 8 shows an image containing a surrounded area to be labeled. The area surrounded by pixels with FF will be labeled with the help of the mask of FIG. 7, as follows:

1) No label will be made before the first FF pixel of a row, i.e., the d1, c3 and b3 pixels of the pattern of
FIG. 7. Pixels a1–c1, a2–b2 and a3 are remained 00.
2) When position A is d1, f1, c2, g2, b3, g3, . . . , they are kept as FF.
3) When position A is d2, f2, c3, . . . , because positions B and D are FF, they are labeled with a value. The value begins from 1 and is cumulated. In FIG. 7, pixel d2 is the first to be labeled and is given the value 1; f2 is the second to be labeled and is given the value 2; c3 is the third and is given the value 3; and so on.

4) When position A is c4, because position D is FF and B is 3 (m), it is given the value 3.
5) When position A is e3, because position B is FF and D is 1 (n), it is given the value 1.
6) When position A is e4, because positions B and D are 1, it is given the value 1.
7) When position A is d3, because position D is 3 (m) and B is 1 (n), it is given the value 3 or 1. Here, d3 is given as 1.

FIG. 9 shows the image of FIG. 8 as labeled. As shown in this figure, the labels of 1, 2 and 3 are considered equivalent; All represent surrounded area. These labels are then set as 1. Counting the number of the pixels labeled as 1 can give the area of the surrounded area.

After the labeling, some surplus values are remained at the right-down corner of the pattern. These pixels, i.e., pixels h6, g7, h7, . . . , are not in the surrounded area. These pixels are then deleted at 142. FIG. 10 shows the result of deletion.

At 143 the number and area of the surrounded areas are recorded. At 144 the areas are recorded in sequence according to their area.

At 145 the difference of the surrounded areas of the two patterns are calculated. Supposing $M_{area}$ represents the number of the surrounded areas and $A_1, A_2, \ldots A_m$ represent the surrounded areas, both of the reference pattern, and $N_{area}$ represents the number of the surrounded areas and $B_1, B_2, \ldots B_n$ represent the surrounded areas, both of the test pattern, the incompleteness of the seal prints can be calculated according to the following equation:

$$\text{Incompleteness} = K \times \sum_{i=1}^{\min(M_{area}, N_{area})} \frac{|Ai - Bi|}{(Ai + Bi)} \quad (6)$$

Determination

After the steps from 110 to 145, the similarity of the patterns can be determined at 150 by the determination device 7. In the embodiment of this invention, the similarity of the seal prints is determined taking the index of similarity as a major factor. The incompleteness is taken as a reference factor, or a warning factor, as follows:

1. If Index of similarity>=Threshold:
   In some embodiments if Index of similarity is equal to or greater than the threshold the seal prints are considered identical.
2. If Incompleteness >=Threshold of incompleteness:
   In some embodiments, such at the registration of the seal print cards, when the incompleteness is equal to or greater than a threshold, the seal print is considered a defected print. In the matching of seal prints, the incompleteness discloses tiny differences in the seal prints. Warning signals will be generated if the incompleteness is equal to or greater than a threshold.

Embodiments

The following is a description of the embodiments of the method and device for the automatic matching of seal prints. In these embodiments, the threshold of similarity is set as 80(%) and the threshold of incompleteness is set as 200.

Embodiment I

Figure 11:
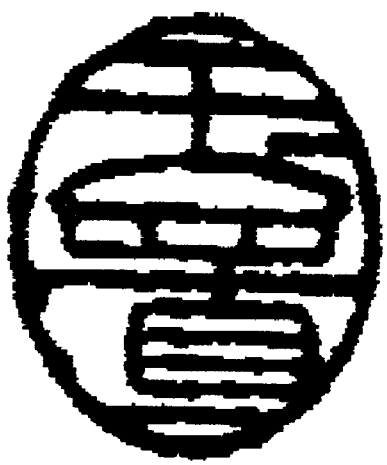
FIG. 11 shows a digitized image of a test seal print.

FIG. 11 shows a digitized image of a test seal print. As shown in the figure, the seal print is printed by the same seal of FIG. 3 which is the reference seal print for the purpose of this embodiment. After matching, the following results are obtained:

1. Similarity in image structure: 100.
2. Similarity in line distribution: 45.
3. Index of similarity: 91.
4. Incompleteness: 123.

Since the "Index" (91) is greater than the threshold of similarity (80) and the incompleteness (123) is less than the threshold of incompleteness (200), the two seal prints are considered identical.

Embodiment II

Figure 12:
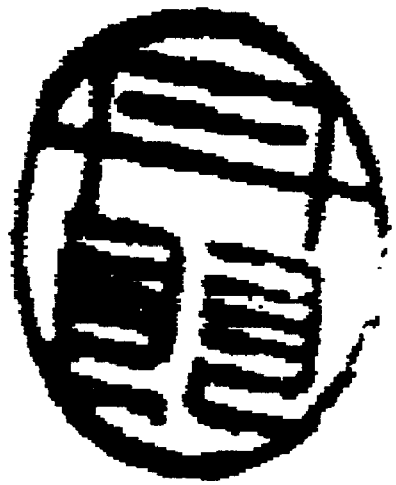
FIG. 12 shows a digitized image of an other test seal print.

FIG. 12 shows a digitized image of an other test seal print. As shown in the figure, the seal print is printed by a different seal with that of FIG. 3 which is the reference seal print for the purpose of this embodiment. After matching, the following results are obtained:

1. Similarity in image structure: 0.
2. Similarity in line distribution: 0.
3. Index of similarity: 0.
4. Incompleteness: 622.

Since the "Index" (0) is smaller than the threshold of similarity (80) and the incompleteness (622) is greater than the threshold of incompleteness (200), the two seal prints are considered different.

Embodiment III

Figure 13:
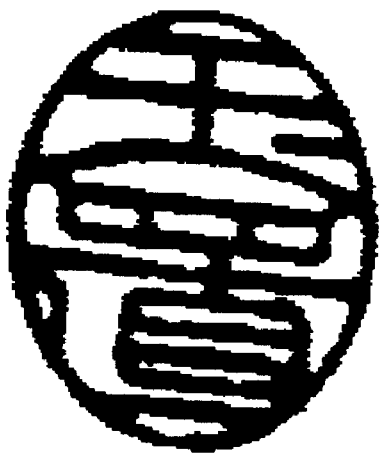
FIG. 13 shows a digitized image of a third test seal print.

FIG. 13 shows a digitized image of a third test seal print. As shown in the figure, the seal print is printed by an imitation seal in accordance with the seal of FIG. 3 which is the reference seal print for the purpose of this embodiment. After matching, the following results are obtained:

1. Similarity in image structure: 100.
2. Similarity in line distribution: 44.
3. Index of similarity: 91.
4. Incompleteness: 234.

Although the "Index" (91) is greater than the threshold of similarity (80), because the incompleteness (234) is greater than the threshold of incompleteness, the two seal prints are considered different. A warning signal is generated so that the operator may pay more attention.

The forgoing description of the preferred embodiments of this invention s chosen and presented for the purposes of illustration and description. It is evident that various modifications may be made thereto in light of the above instructions which are. not specifically described above but which are clearly within the scope and spirit of the present invention. It is therefore intended that all the modifications and variations fall within the scope and spirit of the present invention as determined by the appended claims when interpreted in accordance with the breadth to which they are fairly, legally, and equitably entitled.

What is claimed is:

1. A method for automatic matching of two seal prints comprising:
   digitization of a reference seal print and a test seal prints to be matched wherein the digitized images contain pixels at least with the gray levels of 00 (blank) and FF (point);
   calculation of similarity in image structure of the two digitized images, comprising:
   locating the feature points of the two digitized images; and calculating the similarity of the distribution of the feature points, of the two digitized images;

calculation of similarity in line distribution of the two digitized images, comprising:
locating a reference point in each digitized image;
overlapping the two images using the reference point as central point such that the most number of pixels with the gray level of FF are overlapped; and
calculating the similarity in line distribution according to the following equation:

$$\text{Similarity} = \frac{N_{12} \times (N_1 + N_2)}{N_1 \times N_2}$$

wherein $N_1$ and $N_2$ represent the numbers of pixels with the gray level of "FF" in the two images and $N_{12}$ represents the number of the overlapped points;

calculation of an index of similarity of the two images according to the following equation:

Index=($W_1$*Similarity in image structure+$W_2$*Similarity in line distribution)/W wherein W, $W_1$ and $W_2$ are constants and $W=W_1+W_2$; and determining whether the two seal prints are identical.

2. The method according to claim 1, further comprising a step of calculating the incompleteness of at least one of said seal prints, comprising:
labeling the surrounded areas in the images;
recording the number and area of the surrounded areas;
calculating the difference in the surrounded areas of the two images; and
taking the difference value as the incompleteness of the images.

3. The method according to claim 1 or 2 wherein said feature points comprises terminal points and cross points of line sections or curve sections of the images.

4. The method according to claim 1 or 2 wherein said calculation of similarity in line distribution further comprises a transformation step comprising:
a transformation R is found whereby $$\sum_{i=1}^{k} [(xi - xmi')^2 + (yi - ymi')^2]$$

has the minimum value wherein:

$$\begin{bmatrix} xmi' \\ ymi' \end{bmatrix} = R \begin{bmatrix} xmi \\ ymi \end{bmatrix} = \begin{bmatrix} r1 \\ r2 \end{bmatrix} + \begin{bmatrix} r3 & -r4 \\ r4 & r3 \end{bmatrix} \begin{bmatrix} xmi \\ ymi \end{bmatrix}$$

wherein r1 and r2 represent translation in the vertical and the horizontal direction, r3 and r4 represent rotation, (xmi, ymi) represents the coordinate of the elements of the test seal print and (xmi', ymi') represents the coordinate of the elements of the test seal print after transformation, i=1, 2, ▓, m; m is the number of the overlapped points; and
transform the image of said test seal print with the R transformation.

5. The method according to claim 1 or 2 wherein $W_1$ is 5 and $W_2$ is 1.

6. The method according to claim 1 or 2 wherein the digitization of the seal prints includes scanning seal prints with an image scanner or a CCD camera.

7. The method according to claim 1 or 2 wherein the calculation of similarity in image structure comprises:
for every feature point of the reference image, mating one point in the test image such that the mated pair will be overlapped with or close to each other if they were in the same coordinate plan; and
calculating the similarity of the two images according to the geometric relations of the mated pairs.

8. The method according to claim 1 or 2 wherein the locating of the reference point comprises:
setting the coordinate of the most upper-left pixel as (0, 0); and
locating the coordinate of the reference point ($X_G$, $Y_G$) according to the following equation:

$$(X_G, Y_G) = \left( \frac{\sum_{i=1}^{N} X_i}{N}, \frac{\sum_{j=1}^{N} Y_j}{N} \right)$$

wherein $(X_1, Y_1), (X_2, Y_2), \ldots, (X_N, Y_N)$ represent the coordinates of pixels with the gray level of "FF" in said image and N is the number of pixels with the gray level of "FF" in said image.

9. The method according to claim 1 or 2 wherein the labeling of the surrounded areas comprises:
preparing a 2*2 mask:

| C | B |
|---|---|
| D | A | labeling the pixels of the image with said mask, comprising:
labeling the pixel at A position in said mask as FF if its gray level is FF; otherwise,
labeling the pixel as a value, if the pixel at positions B and D has the gray level of FF; otherwise,
labeling the pixel as the value of the pixel at position B or D, if one of the pixels at position B or D has the gray level of FF and the other has a value other than FF or 00; otherwise;
labeling the pixel as the value of the pixel at position B or D, of both the pixels at positions B and D have value(s) other than 00 or FF; and
deleting the values outside the surrounded areas.

10. The method according to claim 9 wherein the area of the surrounded area is calculated according to the number of pixels with values other than 00 or FF.

11. The method according to claim 1 or 2 wherein said value of incompleteness is calculated according to the following equation:

$$\text{Incompleteness} = K \times \sum_{i=1}^{\min(M_{area}, N_{area})} \frac{|Ai - Bi|}{(Ai + Bi)}$$

wherein $M_{area}$ represents the number of the surrounded areas and $A_1, A_2, \ldots A_m$ represent the surrounded areas, both of the reference image, and $N_{area}$ represents the number of the surrounded areas and $B_1, B_2, \ldots B_n$ represent the surrounded areas, both of the test image.

12. A device for the automatic matching of seal prints, comprising:
a first memory to store images of reference seal prints; an input device to obtain the image of a test seal print;

a second memory to store the test seal print;

an image structure similarity calculation device to calculate the similarity in the structure of the image of the reference seal print and the test seal print;

a line distribution similarity calculation device to calculate the similarity in the distribution of the lines in the reference seal print and the test seal print;

an incompleteness calculation device to calculate the incompleteness of the image of the reference seal print and the test seal print;

a similarity index calculation device to calculate a similarity index of the two seal prints according to the following equation:

Index=($W_1$*Similarity in image structure+$W_2$*Similarity in line distribution)/W wherein W, $W_1$ and $W_2$ are constants and W=$W_1$+$W_2$; and a determination device to determine whether the two seal prints are from the same source by comparing said similarity index with a pre-determined threshold.

13. The device according to claim 12 wherein said image structure similarity calculation device locates the feature points of the two digitized images and calculates the similarity in the distribution of the feature points, of the two digitized images; wherein said feature points comprises terminal points and cross points of line sections or curve sections of the images.

14. The device according to claim 13 wherein said image structure similarity calculation device further mates, for every feature point of the reference image, one point in the test image such that the mated pair will be overlapped with or with very short distance with each other if they were in the same coordinate plan; and calculates the similarity of the two images according to the geometric relations of the mated pairs.

15. The device according to claim 12 wherein said line distribution similarity calculation device locates a reference point in each digitized image; overlaps the two images using the reference point as central point such that the most number of pixels with the gray level of FF are overlapped; and calculates the similarity in line distribution according to the following equation:

$$\text{Similarity} = \frac{N_{12} \times (N_1 + N_2)}{N_1 \times N_2}$$

wherein $N_1$ and $N_2$ represent the numbers of pixels with the gray level of "FF" in the two images and $N_{12}$ represents the number of the overlapped points.

16. The device according to claim 15 wherein said line distribution similarity calculation device locates the coordinate of said reference point ($X_G$, $Y_G$) according to the following equation:

$$(X_G, Y_G) = \left( \frac{\sum_{i=1}^{N} X_i}{N}, \frac{\sum_{j=1}^{N} Y_j}{N} \right)$$

wherein ($X_1$, $Y_1$), ($X_2$, $Y_2$), ..., ($X_N$, $Y_N$) represent coordinates of pixels with the gray level of "FF" of said image and N is the number of pixels with the gray level of "FF" of said image and wherein the coordinate of the most upper-left pixel is (0, 0).

17. The device according to claim 12 wherein said incompleteness calculation device labels the surrounded areas in the images; records the number and area of the surrounded areas; calculates the difference in the surrounded areas of the two images; and takes the value of difference as the incompleteness of the images.

18. The device according to claim 17 wherein said incompleteness calculation device labels the surrounded areas of said images by:

preparing a 2*2 mask:

| C | B |
|---|---|
| D | A |

;

labeling the pixels of the image with said mask, comprising:

labeling the pixel at A position in said mask as FF if its gray level is FF; otherwise, labeling the pixel as a value, if the pixel at positions B and D has the gray level of FF; otherwise, labeling the pixel as the value of the pixel at position B or D, if one of the pixels at position B or D has the gray level of FF and the other has a value other than FF or 00; otherwise;

labeling the pixel as the value of the pixel at position B or D, of both the pixels at positions B and D have value(s) other than 00 or FF; and deleting the values outside the surrounded areas.

19. The device according to claim 18 wherein said incompleteness calculation device calculates the area of said surrounded area according to the number of pixels with values other than 00 or FF.

20. The device according to claim 17 wherein said incompleteness calculation device calculates the value of incompleteness according to the following equation:

$$\text{Incompleteness} = K \times \sum_{i=1}^{\min(M_{area}, N_{area})} \frac{|Ai - Bi|}{(Ai + Bi)}$$

wherein $M_{area}$ represents the number of the surrounded areas and $A_1, A_2, \ldots A_m$ represent the surrounded areas, both of the reference image, and $N_{area}$ represents the number of the surrounded areas and $B_1, B_2, \ldots B_n$ represent the surrounded areas, both of the test image.

21. The device according to claim 12, 13, 15 or 17 wherein said line distribution similarity calculation device further transforms the image of said test seal print with a geometric transformation R wherein:

$$\begin{bmatrix} xmi' \\ ymi' \end{bmatrix} = R \begin{bmatrix} xmi \\ ymi \end{bmatrix} = \begin{bmatrix} r1 \\ r2 \end{bmatrix} + \begin{bmatrix} r3 & -r4 \\ r4 & r3 \end{bmatrix} \begin{bmatrix} xmi \\ ymi \end{bmatrix}$$

wherein r1 and r2 represent translation in the vertical and the horizontal direction, r3 and r4 represent rotation, (xmi, ymi) represents the coordinate of the points of the test seal print and (xmi', ymi') represents the coordinate of the points of the test seal print after transformation, i=1, 2, ..., m; m is the number of the overlapped points; and whereby $$\sum_{i=1}^{k} [(xi - xmi')^2 + (yi - ymi')^2]$$

has the minimum value.

22. The device according to claim 12 wherein $W_1$ is 5 and $W_2$ is 1.

23. The device according to claim 12, 13, 15 or 17 wherein said input device is selected from an imagescanner or a CCD camera.

* * * * *